United States Patent [19]

Weingartner

[11] Patent Number: 5,305,821
[45] Date of Patent: Apr. 26, 1994

[54] HIGH-TEMPERATURE HEAT STORAGE DEVICE

[75] Inventor: Stefan Weingartner, Munich, Fed. Rep. of Germany

[73] Assignee: Deutsche Forschungsanstalt fuer-Luft und Raumfahrt e.V., Bonn, Fed. Rep. of Germany

[21] Appl. No.: 724,971

[22] Filed: Jul. 1, 1991

[30] Foreign Application Priority Data

Jul. 5, 1990 [DE] Fed. Rep. of Germany ........ 4021492

[51] Int. Cl.$^5$ ............................................. F23D 20/00
[52] U.S. Cl. ................... 165/10; 165/104.11; 126/400
[58] Field of Search ............... 165/10, 104.11; 126/400

[56] References Cited

U.S. PATENT DOCUMENTS 3,918,517 11/1975 Silverstone et al. .
4,003,426 1/1977 Best et al. ......................... 165/10
4,268,558 5/1981 Boardman ......................... 165/10

FOREIGN PATENT DOCUMENTS 271118 6/1988 European Pat. Off. .
2645742 4/1978 Fed. Rep. of Germany .
2536155 5/1984 France .
123995 5/1988 Japan ..................................... 165/10
2224112 4/1990 United Kingdom .

OTHER PUBLICATIONS

Patent Abstract of Japan, vol. 13, No. 33, Jan. 1989.
Patent Abstract of Japan, vol. 6, No. 260, Dec. 1982.

Primary Examiner—Albert W. Davis, Jr.
Attorney, Agent, or Firm—Barry R. Lipsitz

[57] ABSTRACT

In order to improve a heat storage device comprising a storage container which has an inner chamber for accommodating alkali and alkaline earth compounds, in particular alkali and alkaline earth halides, and their eutectics as storage medium such that mechanical stresses no longer occur and the behavior of the heat storage device is such that its capability for receiving and discharging energy may be calculated as far as possible, it is suggested that a substantially open-pored structure consisting of a material wettable by the storage medium be arranged in the inner chamber and that the structure be soaked with the storage medium.

23 Claims, 2 Drawing Sheets

HIGH-TEMPERATURE HEAT STORAGE DEVICE

The invention relates to a heat storage device comprising a storage container having an inner chamber for accommodating alkali and alkaline earth compounds, in particular alkali and alkaline earth halides, and their eutectics as storage medium.

Heat storage devices of this type are preferably used as high-temperature heat storage devices, whereby the free inner chamber of the container is filled with the storage medium. The problem with a heat storage device of this type is that the volume of the storage medium increases by up to 30%, according to its composition, when it is converted from the solid to the completely liquid state. This leads to mechanical problems, in particular, when charging a heat storage device of this type since the storage medium immediately adjoining the storage container begins to melt in the region of wall surfaces of the storage container and expand, with respect to its volume, by the stated amount. However, in view of the core of storage medium seated thereabove, which is not yet solidified, it has no possibility of expanding into the hollow spaces preferably formed at a distance from the wall surfaces of the storage container during solidifying. For this reason, storage containers of this type are subjected to high mechanical stresses during the charging cycle due to the increase in pressure.

In addition, problems are incurred in such heat storage devices due to the fact that the heat storage device behaves inhomogeneously with respect to its capacity to receive and discharge energy. In other words, it cannot be ascertained exactly what amount of heat the storage device is capable of discharging or receiving per time unit since the amount of heat to be received or discharged per time unit varies due to the fact that hollow spaces are formed in or removed from the storage medium in an irregular manner and so the storage medium is inhomogeneous in its behaviour.

The object underlying the invention is therefore to improve a heat storage device of the type described at the outset such that the specified mechanical stresses no longer occur and that the behaviour of the heat storage device is such that its capability for receiving and discharging energy can be calculated as far as possible.

This object is accomplished, according to the invention, for a heat storage device of the type described at the outset in that a substantially open-pored structure consisting of a material wettable by the storage medium is arranged in the inner chamber and that the structure is soaked with the storage medium.

With the inventive solution it is possible to keep the storage medium distributed by the open-pored structure, even during solidifying, throughout the entire inner chamber due to the capillary action. This means that during solidifying of the storage medium the unavoidable hollow spaces will still be formed but these will be finely, i.e. homogeneously distributed throughout the inner chamber. The mechanical stresses will, therefore, no longer occur in the storage container during transition from the solid to the liquid state and, moreover, a homogeneous behaviour of the storage medium during transition from the solid to the liquid phase and vice versa is achieved.

In order for the inventive heat storage device to be particularly efficient, the pores of the structure are substantially filled with liquid storage medium.

In the inventive solution described thus far, no details have been given concerning the type of structure. It is advantageous, to achieve a behaviour which is as homogeneous as possible, for the structure to be a regular, open-pored structure.

Examples of a regular open-pored structure are a matrix mesh or a honeycomb structure.

Alternatively, it is also advantageous for the structure to be an irregular, open-pored structure since this also leads to the inventive effect and offers the advantage that it is far easier to produce.

In a preferred embodiment of the inventive structure, this is a foam structure.

Essential features of the structure are also its pore volume since this again influences the degree to which the inner chamber of the storage container is filled and, therefore, the maximum amount of energy which can be stored. For this reason, the pore volume is intended to be as large as possible.

In this respect, it is advantageous for the structure to have a pore volume of more than 75%. It is even better, however, to have pore volumes of more than 80% or more than 90%. In an embodiment which is considered to be the best so far, a pore volume in the order of 95% was achieved.

Moreover, the pore size of the inventive structure is also of importance. In a peripheral requirement for an advantageous embodiment the structure has an average pore size of more than approximately 0.1 mm. It is, however, particularly advantageous for the structure to have an average pore size in the order of 2 to 3 mm.

An additional, essential advantage of the inventive structure is achieved when this is a coherent structure inflexible in itself which therefore leads to a defined distribution of the storage medium throughout the inner chamber. A further advantage of the structure as a coherent structure inflexible in itself is the fact that it can also contribute to conducting heat into the storage medium or out of the storage medium.

In the simplest case, the structure is an integral, substantially open-pored body which can also be composed of multisectional integral subbodies.

It is particularly favourable, especially when gradients of density and/or temperature and/or heat conductivity and/or capillary force are desired in the inventive heat storage device, for the structure to have an average pore size varying, i.e. increasing or decreasing, in one direction. This can be a continuous variation in the average pore size or a sudden variation in the average pore size. In the simplest case, the structure is constructed of different integral subbodies.

It has proven to be particularly advantageous, especially from the point of view of production technologies, for the structure to be manufactured as a coherent open-pored structure having unfilled pores. This enables any number of known production methods to be used for producing the structure without having to take the sensitive storage medium into consideration during the manufacturing process for the structure.

For this reason it is particularly expedient for the unfilled pores of the structure to be fillable with the storage medium after their production.

In order to produce a particularly good heat contact between the storage container and the storage medium, the structure abuts on an inner side of the storage container. It is, however, even better to have the structure connected to the storage container.

The transfer of heat is particularly favourable when the structure is produced from a material which is a good heat conductor.

One preferred material for the production of the structure is metal. In this respect, all those metals, from which the storage container can, for example, also be produced, can be taken into consideration. Examples for such types of metal are materials, such as high-purity nickel, high-alloyed steels, nickel cobalt or nickel-niobium alloys.

As an alternative to the use of metals as material for the structure, it is also conceivable to specify ceramic materials. A preferred ceramic material is Sircon ($Si_3N_4$-SiC)(=a material produced by Elektroschmelzwerk Kempten GmbH, Postfach 609, 8000 Munich 3, West Germany), silicon carbide (SiC), C-SiC composite fibers, SiC-SiC composite fibers, cordierite (MgO $Al_2O_3$ $SiO_2$), aluminum oxide ($Al_2O_3$) and mullite ($3Al_2O_3$-$2SiO_2$).

With respect to the material for the storage container it is particularly advantageous for this container to be made from a material which can be closed so as to be gas-tight, preferably a metal. In this respect, the same materials as those mentioned above in connection with the structure can be considered as metals.

In addition, the object underlying the invention is to provide a method for producing a heat storage device, comprising a storage container and alkali and alkaline earth compounds, in particular alkali and alkaline earth halides, and their eutectics arranged in the inner chamber of the storage container as storage medium, whereby the heat storage device is intended to be constructed, in particular, according to the features described above.

This object is accomplished according to the invention in that pores of a substantially open-pored structure wettable by the storage medium are filled with the liquid storage medium, the storage medium is converted into the solid phase and the structure filled with the storage medium is inserted into the storage container.

This creates a method for producing a heat storage device with the advantageous properties described above, which is very simple and, above all, inexpensive to carry out.

In this respect, it is particularly expedient for the pores of the structure to be filled with liquid storage medium in a container made of material not wettable with the storage medium and for the storage medium to be converted into the solid phase in this container as the storage medium will not then adhere to the container after solidifying. This container is preferably formed of graphite or glass carbon or boron nitride.

In addition, it is advantageous for the container to have the form of the storage container so that the structure filled with the solidified storage medium can be removed from the container in a simple manner and be inserted into the storage container without the need for further processing steps.

An additional solution to the inventive object is achieved, alternatively to that specified above, in that the pores of a substantially open-pored structure wettable by the storage medium are filled by introducing this structure into the storage container containing liquid storage medium.

This method is also very easy to carry out. It has, above all, the advantage that the structure is made from a material which can be wetted by the storage medium and so the storage medium will immediately be evenly distributed throughout the structure upon its introduction.

Alternatively hereto, the aforementioned object is also accomplished by a method, in which the pores of a substantially open-pored structure wettable by storage medium are filled by pouring liquid storage medium into the storage container already containing the structure. Again, a fine distribution of the storage medium in the structure takes place immediately due to the fact that the structure is made of a material which can be wetted by storage medium.

This aforementioned method is particularly advantageous when the structure is securely connected to the storage container so that the storage container can first be firmly connected to the structure and then the storage medium poured in.

The inventive heat storage device may be used particularly advantageously as a heat buffer, heat shield for spacecraft or safes or for maintaining the temperature in machines.

Additional features and advantages of the invention are the subject matter of the following description as well as the drawings of several embodiments, in which.

Figure 1:
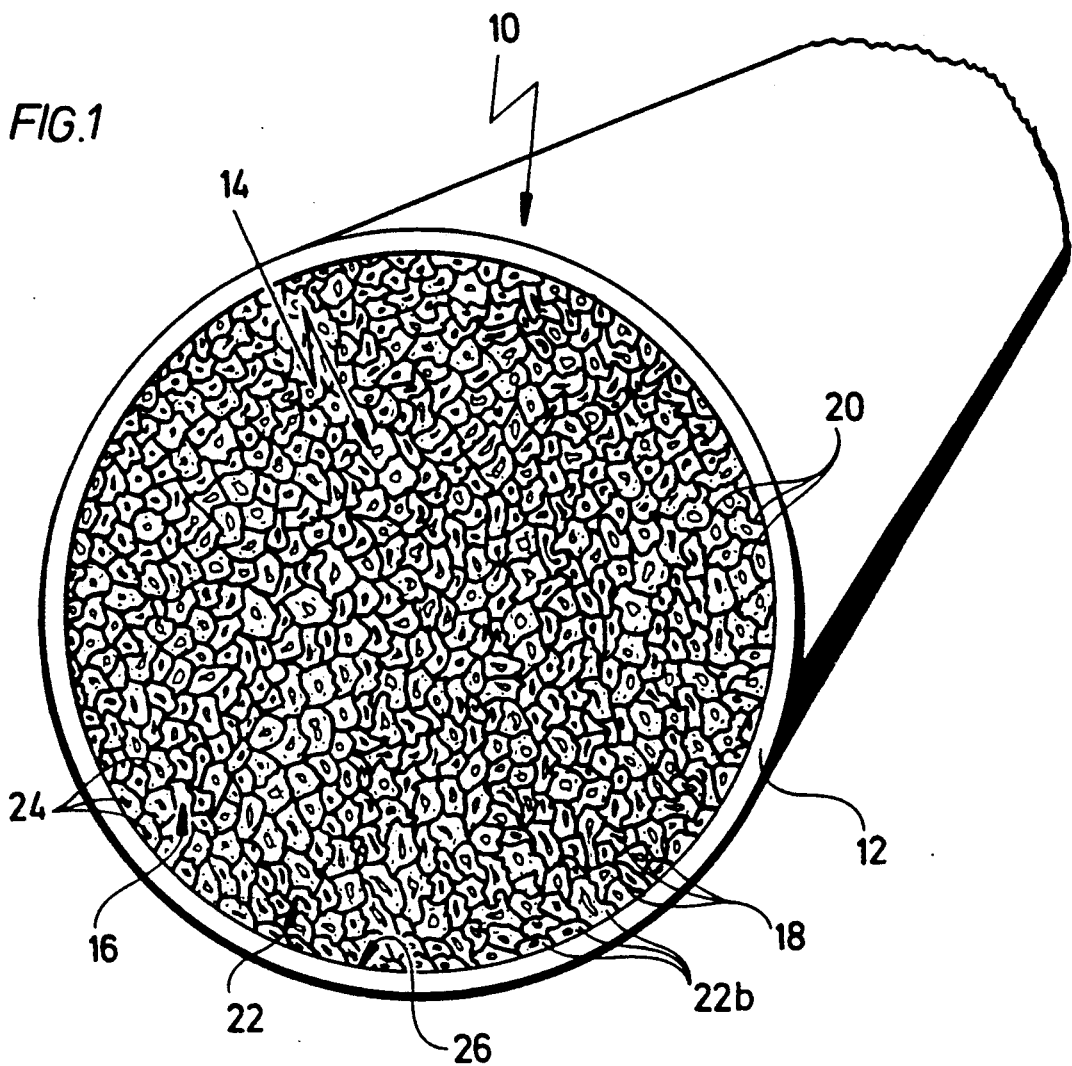
FIG. 1 is a section through a first embodiment of an inventive heat storage device.
Figure 2:
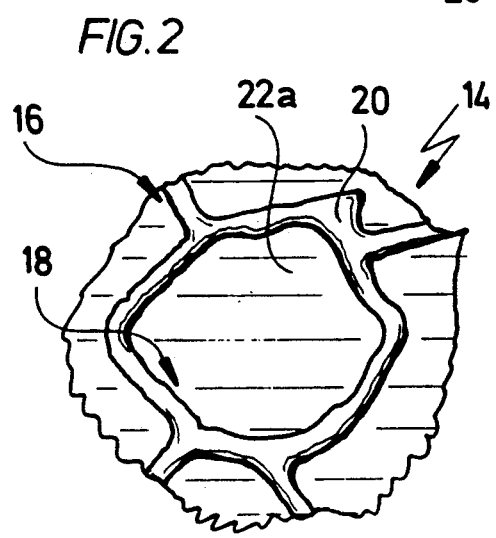
FIG. 2 is an enlarged illustration of a pore of a structure according to the first embodiment, filled with liquid storage medium.
Figure 3:
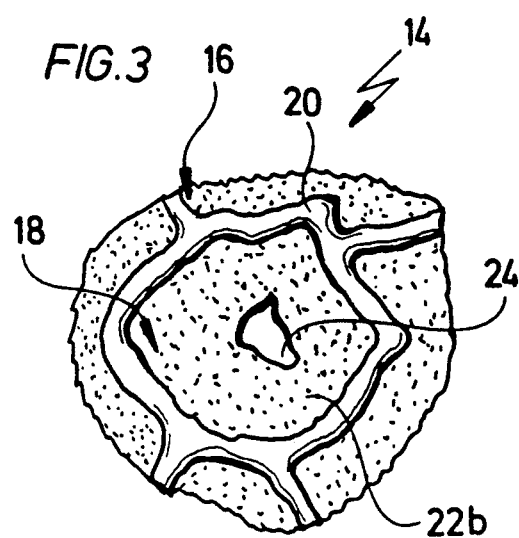
FIG. 3 is the enlarged illustration of the same pore, filled with solid storage medium.

A first embodiment of an inventive heat storage device, illustrated in FIG. 1, comprises a storage container designated as a whole as 10. This comprises a cylindrical outer casing 12 which is preferably closed by end faces which are not illustrated. The storage container 10 has an inner chamber 14, in which a structure 16 is arranged. This is a foam-like structure having wall webs 20 forming open pores 18. This structure 16 is produced from a material which is wettable by a storage medium 22. The storage medium 22 is present in the storage container 10 either in its liquid phase as storage medium 22a, as illustrated in FIG. 2, or in its solid phase as storage medium 22b, as illustrated in FIG. 3. In the inventive solution, the entire structure 16 is soaked with the storage medium 22. In this respect, the storage medium 22a in the liquid phase essentially fills all the pores 18 completely, as illustrated in FIG. 2, whereas the storage medium 22b in the solid phase, as illustrated in FIG. 3, is deposited adjacent the wall webs 20 of the pores 18 and forms voids or hollow spaces 24, preferably in the central inner region of the pores 18.

This fine distribution of the voids 24 in the individual pores 18 is brought about by the fact that the wall webs 20 of the pores 18 are made from the material wettable by the storage medium 22 and so the storage medium in its liquid state can constantly be kept evenly distributed throughout the entire structure 16 by the webs 20 and even when solidified it remains adjacent the webs 20.

This achieves a substantially homogeneous distribution of the solidified storage medium 22b throughout the entire structure 16 and, therefore, in the entire inner chamber 14. Again, no problems are incurred during melting of the storage medium 22b since the voids 24 in the individual pores 18 can each be filled and receive the storage medium 22a which has a greater volume in the liquid state.

Moreover, the open-pored structure 16 is selected such that it abuts on an inner wall 26 of the cylindrical outer casing 12 and, therefore, a good heat conduction between the cylindrical outer casing 12 and the structure 16 is ensured.

If, for example, the structure 16 is made from a material which is a good heat conductor, the heat transferred to the inventive heat storage device will be passed to the structure 16 via the cylindrical outer casing 12 and then transferred from the wall webs 20 to each individual pore 18 and causes the solid storage medium 22b to melt. This ensures a very even and good heat absorption by the inventive heat storage means.

Similarly, a withdrawal of heat via the cylindrical outer casing will lead to heat also being withdrawn from the structure 16. This means that heat is withdrawn from each individual pore due to the heat conductivity of the wall webs 20 and, therefore, via the contact with the storage medium 22a found therein the storage medium 22a in each pore 18 is cooled.

Figure 4:
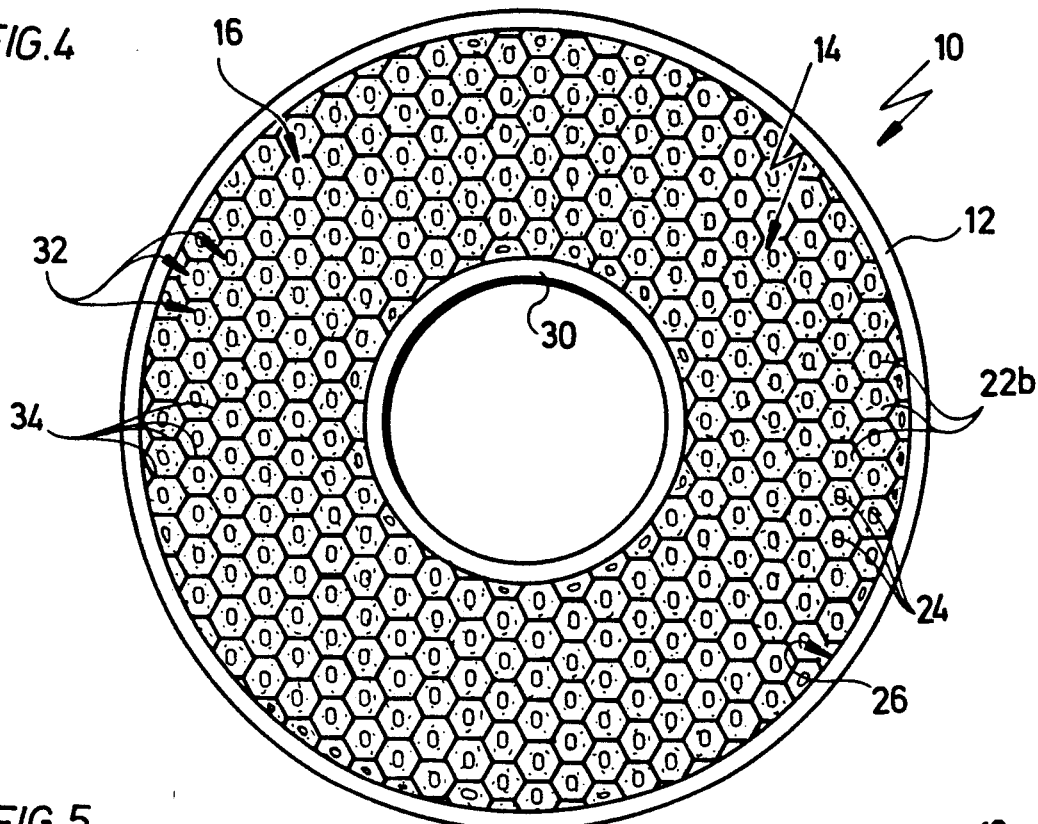
FIG. 4 is a section through a second embodiment.

In a second embodiment of an inventive heat storage device, illustrated in FIG. 4, the storage container 10 comprises not only a cylindrical outer casing 12 but also a cylindrical inner casing 30 and so the inner chamber 14 has the shape of a ring cylinder. The structure 16 provided in this inner chamber 14 is one having individual honeycombs 32 which are arranged in a regular pattern. Each individual honeycomb is formed of honeycomb walls 34 which leave the honeycomb 32 open, however, at at least one side so that, altogether, an open-pored honeycomb structure is present.

In the same manner as in the first embodiment, the structure 16 is produced from a material wettable with the storage medium so that the liquid storage medium 22a essentially fills the honeycombs 32 while the solid storage medium 22b, in the same manner as in the first embodiment, forms voids 24 and is deposited on the honeycomb walls 34.

Otherwise, the heat storage device according to the second embodiment functions in the same way as the heat storage device according to the first embodiment so that reference can be made to the comments hereto.

In contrast to the first embodiment, a ring-shaped inner chamber 14 offers the possibility of producing the structure 16 from a material which is not as good a heat conductor since the space between the inner casing 30 and the outer casing 12 is less. This means that the heat need not be transferred over very long paths when, for example, heat is supplied and removed both via the outer casing 12 and the inner casing 30.

Figure 5:
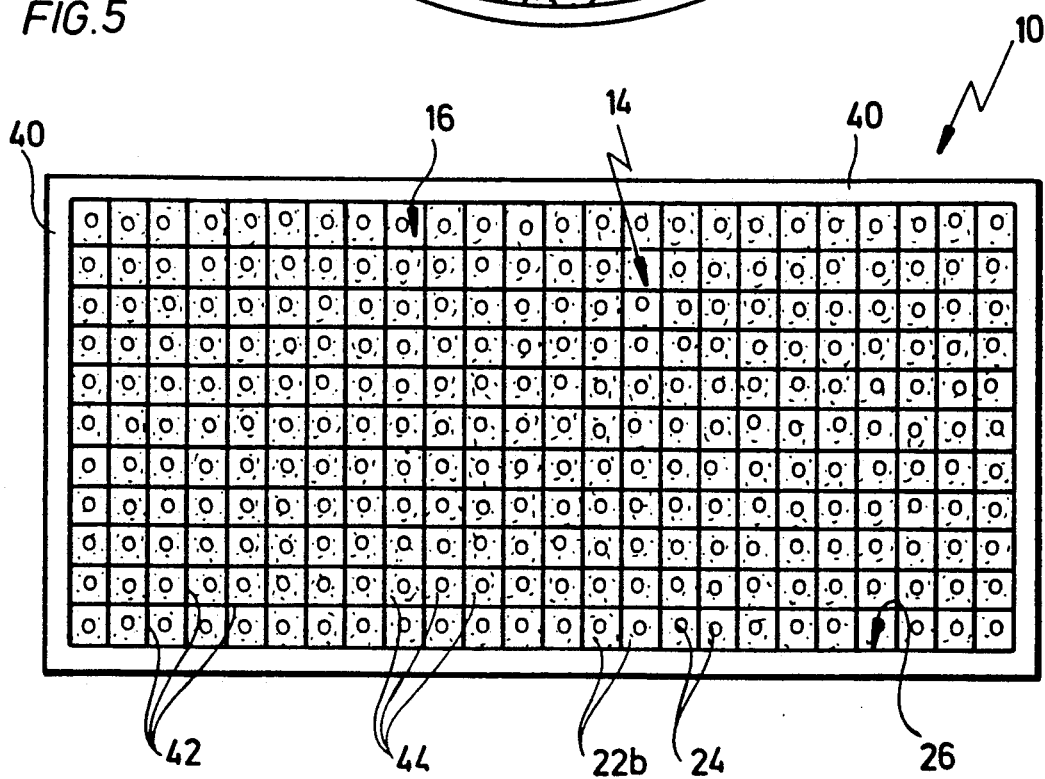
FIG. 5 is a section through a third embodiment.

In a third embodiment, illustrated in FIG. 5, the storage container 10 is formed from a parallelepiped having plane wall surfaces 40 so that a parallelepiped inner chamber 14 also results. The structure 16 arranged in this inner chamber 14 is constructed from walls 42 extending at right angles to one another. These walls run parallel to the wall surfaces 40 of the storage container 10 and form rectangular hollow spaces 44 which correspond to the pores 18 or the honeycombs 32. In the same way as in the first and second embodiments, the hollow spaces are open-pored, i.e. they are all interconnected so that the structure 16 can also be completely soaked with storage medium. In this respect, the liquid storage medium 22a substantially fills the inner chamber 14 and, with it, the hollow spaces 44 as well while the solid storage medium 22b abuts on the walls 42 and forms voids finely distributed over all the hollow spaces 44.

In the same way as in the first and second embodiments, the structure is formed from a material wettable by the storage medium 22.

Moreover, the structure is securely connected to the wall surfaces 40 and, in particular, made from a material which is a good heat conductor so that a good heat conduction exists between the wall surfaces 40 and the walls 42 of the structure 16. This means that large amounts of heat can be quickly and simply fed into and withdrawn from the heat storage means.

All three embodiments have in common the fact that alkali and alkaline earth compounds, in particular alkali and alkaline earth halides, and their eutectics are preferably used as storage materials. These materials are excellent high-temperature heat storers and are particularly well suited both for space flight and also for terrestrial applications in view of their high storage capacity. These materials are subject to volume variations of up to 30% during transition from the liquid to the solid state.

In all the embodiments, metals and ceramics can preferably be considered as materials for the structure 16, the condition being that these must be wettable by the aforementioned storage materials. For example, silicon carbide or Sircon may be used as material for the structure.

All those materials, from which gas-tight storage containers may be produced, can be considered as materials for the storage container 10. These are preferably metals and certain ceramics, such as glass carbon, SiC etc. It is, however, also conceivable to produce the storage container from materials which are not gas-tight, such as, for example, graphite, and to then make the storage container 10 gas-tight by coating it with, for example, SiC, boron nitride and pyrocarbon.

The present disclosure relates to the subject matter disclosed in German application No. P 40 21 492.3 of Jul. 5, 1990, the entire specification of which is incorporated herein by reference.

What is claimed is:

1. Heat storage device comprising:
   a storage container of gas tight material having an inner chamber for accommodating anhydrous alkali and alkaline earth halides, and their eutectics as a storage medium in both a solid phase and a liquid phase, said storage medium being subject to substantial volume variations of up to about 30% during transitions between its solid and liquid states, and
   a substantially open-pored structure consisting of a material wettable by the storage medium arranged in the inner chamber and having an average pore size of greater than approximately 0.1 mm, wherein said structure is soaked with the storage medium and accommodates the substantial volume variations of said storage medium to prevent damage to said storage container.

2. Heat storage device as defined in claim 1, characterized in that pores of the structure are substantially filled with liquid storage medium.

3. Heat storage device as defined in claim 1, characterized in that the structure is a regular open-pored structure.

4. Heat storage device as defined in claim 3, characterized in that the structure is formed by a matrix mesh.

5. Heat storage device as defined in claim 3, characterized in that the structure is a honeycomb structure.

6. Heat storage device as defined in claim 1, characterized in that the structure is an irregular open-pored structure.

7. Heat storage device as defined in claim 6, characterized in that the structure is a foam structure.

8. Heat storage device as defined in claim 1, characterized in that the structure has a pore volume of more than 75%.

9. Heat storage device as defined in claim 1, characterized in that the structure has an average pore size in the order of 2 to 3 mm.

10. Heat storage device as defined in claim 1, characterized in that the structure is a coherent structure inflexible in itself.

11. Heat storage device as defined in claim 10, characterized in that the structure is an integral, substantially open-pored body.

12. Heat storage device as defined in claim 1, characterized in that the structure has an average pore size varying in one direction.

13. Heat storage device as defined in claim 1, characterized in that the structure abuts on an inner side of the storage container.

14. Heat storage device as defined in claim 1, characterized in that the structure is connected to the storage container.

15. Heat storage device as defined in claim 1, characterized in that the structure is produced from a material which is a good heat conductor.

16. Heat storage device as defined in claim 1, characterized in that the structure is made of metal.

17. Heat storage device as defined in claim 1, characterized in that the structure is made of a ceramic material.

18. Heat storage device as defined in claim 1, characterized in that the storage container is closable so as to be gas-tight.

19. Heat storage device as defined in claim 1, wherein the pores of said substantially open-pored structure range from about 0.1 mm to about 3 mm in size.

20. Heat storage device comprising:
a storage container of gas tight material having an inner chamber for accommodating anhydrous alkali and alkaline earth halides, and their eutectics as a storage medium in both a solid phase and a liquid phase, said storage medium being subject to substantial volume variations of up to about 30% during transitions between its solid and liquid states, and
a substantially open-pored structure consisting of a material wettable by the storage medium arranged in the inner chamber and having an average pore size of greater than approximately 0.1 mm, wherein said structure is produced as a coherent open-pored structure having unfilled pores which is subsequently soaked with said storage medium and which accommodates the substantial volume variations of said storage medium to prevent damage to said storage container.

21. Heat storage device as defined in claim 20, wherein the pores of said substantially open-pored structure range from about 0.1 mm to about 3 mm in size.

22. Heat storage device as defined in claim 20, characterized in that the unfilled pores are adapted to be filled with the storage medium.

23. Heat storage device comprising:
a storage container of gas tight material having an inner chamber for accommodating anhydrous alkali and alkaline earth compounds and their eutectics as a storage medium in both a solid phase and a liquid phase, said storage medium being subject to substantial volume variations of up to about 30% during transitions between its solid and liquid states, and a substantially open-pored structure consisting of a material wettable by the storage medium arranged in the inner chamber and having pores with an average pore size of such dimension that in its liquid phase said storage medium essentially fills said pores completely whereas in its solid phase said storage medium is deposited adjacent wall webs of said pores and forms voids or hollow spaces.

* * * * *